US011784509B2

(12) United States Patent
Samojeden et al.

(10) Patent No.: US 11,784,509 B2
(45) Date of Patent: *Oct. 10, 2023

(54) AUTOMATED ELECTRIC VEHICLE CHARGING

(71) Applicant: Hubbell Incorporated, Shelton, CT (US)

(72) Inventors: Matthew Samojeden, Rye, NY (US); Shawn Monteith, Burlington, CT (US)

(73) Assignee: Hubbell Incorporated, Shelton, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/880,589

(22) Filed: May 21, 2020

(65) Prior Publication Data

US 2020/0282856 A1  Sep. 10, 2020

Related U.S. Application Data

(63) Continuation of application No. 15/981,468, filed on May 16, 2018, now Pat. No. 10,661,674.

(Continued)

(51) Int. Cl.
*H02J 13/00* (2006.01)
*H01M 10/44* (2006.01)
(Continued)

(52) U.S. Cl.
CPC ...... H02J 13/00034 (2020.01); B60L 53/305 (2019.02); B60L 53/63 (2019.02);
(Continued)

(58) Field of Classification Search
CPC .... H02J 3/00; H02J 3/14; H02J 7/0013; H02J 7/0049; H02J 2310/64; H02J 3/322;
(Continued)

(56) References Cited

U.S. PATENT DOCUMENTS 6,493,644 B1 * 12/2002 Jonker ................ G01R 21/133
702/182
8,169,185 B2 * 5/2012 Partovi ................... H02J 50/10
320/108

(Continued)

FOREIGN PATENT DOCUMENTS

CA         2733288 A1 * 5/2010 ............... B60L 3/12
DE    102013002078      8/2013
(Continued)

OTHER PUBLICATIONS

PCT/US2018/032980 International Search Report and Written Opinion dated Aug. 3, 2018 (10 pages).
(Continued)

*Primary Examiner* — M Baye Diao
(74) *Attorney, Agent, or Firm* — Michael Best & Friedrich LLP

(57) ABSTRACT

Apparatus and method for automated electric vehicle charging. One embodiment provides a method for automated charging. The method includes storing, in a memory, a rate profile of a power grid, the rate profile including at least one time period and at least one rate associated with the at least one time period. The method further includes generating, using the electronic processor and based on the rate profile, a charging profile, and charging, using a charging controller of a charger coupled to the electronic processor, based on the charging profile.

18 Claims, 7 Drawing Sheets

Related U.S. Application Data

(60) Provisional application No. 62/506,890, filed on May 16, 2017.

(51) Int. Cl.
| | |
|---|---|
| *B60L 53/64* | (2019.01) |
| *B60L 58/12* | (2019.01) |
| *B60L 55/00* | (2019.01) |
| *B60L 53/63* | (2019.01) |
| *B60L 53/67* | (2019.01) |
| *B60L 53/66* | (2019.01) |
| *B60L 53/30* | (2019.01) |
| *H02J 3/14* | (2006.01) |
| *H02J 7/00* | (2006.01) |
| *H02J 3/00* | (2006.01) |
| *H02J 3/32* | (2006.01) |

(52) U.S. Cl.
CPC .............. *B60L 53/64* (2019.02); *B60L 53/66* (2019.02); *B60L 53/67* (2019.02); *B60L 55/00* (2019.02); *B60L 58/12* (2019.02); *H01M 10/44* (2013.01); *H02J 3/00* (2013.01); *H02J 3/14* (2013.01); *H02J 3/322* (2020.01); *H02J 7/0013* (2013.01); *B60L 2240/80* (2013.01); *H01M 2220/20* (2013.01); *H02J 7/0049* (2020.01); *H02J 2310/48* (2020.01); *H02J 2310/64* (2020.01)

(58) Field of Classification Search
CPC ...... H02J 2310/48; B60L 58/12; B60L 55/00; B60L 53/63; B60L 53/67; B60L 53/66; B60L 53/305; B60L 53/64; B60L 2240/80; H01M 10/44; H01M 2220/20; Y02E 60/00; Y02E 60/10; Y04S 10/126; Y04S 30/14; Y04S 30/12; Y02T 90/12; Y02T 90/14; Y02T 10/7072; Y02T 10/70; Y02T 90/167; Y02T 90/16
USPC ........................................................ 320/109
See application file for complete search history.

(56) References Cited

U.S. PATENT DOCUMENTS

| | | | | |
|---|---|---|---|---|
| 8,212,532 | B2* | 7/2012 | Kumar | B60L 58/14 |
| | | | | 320/155 |
| 8,686,687 | B2* | 4/2014 | Rossi | H02J 13/00034 |
| | | | | 307/18 |
| 9,106,083 | B2* | 8/2015 | Partovi | H02J 50/80 |
| 9,134,380 | B2* | 9/2015 | Duncan | G01R 31/3648 |
| 9,178,369 | B2* | 11/2015 | Partovi | H02J 50/90 |
| 9,501,121 | B2* | 11/2016 | Hashimoto | G06K 15/1823 |
| 9,511,677 | B1 | 12/2016 | Brooks | |
| 9,559,520 | B2* | 1/2017 | Shelton | H02M 7/44 |
| 9,616,879 | B2* | 4/2017 | Zhao | B60W 20/13 |
| 9,672,068 | B2* | 6/2017 | Gaurav | G06F 9/4893 |
| 9,802,504 | B2* | 10/2017 | Jones | B60L 53/63 |
| 9,995,591 | B2* | 6/2018 | Shimizu | B60L 53/665 |
| 10,055,911 | B2* | 8/2018 | Luke | B60L 53/68 |
| 10,090,567 | B2 | 10/2018 | Austin | |
| 10,389,136 | B2* | 8/2019 | Drees | H02S 40/32 |
| 10,778,008 | B2* | 9/2020 | Levy | H02J 3/144 |
| 11,376,984 | B2* | 7/2022 | Samojeden | H02J 13/0075 |
| 2010/0292629 | A1* | 11/2010 | Dacey, Jr. | A61L 2/08 |
| | | | | 604/8 |
| 2011/0231320 | A1* | 9/2011 | Irving | G06Q 30/00 |
| | | | | 705/80 |
| 2011/0316482 | A1* | 12/2011 | Baxter | B60L 50/40 |
| | | | | 320/109 |
| 2012/0200260 | A1* | 8/2012 | Karner | B60L 53/63 |
| | | | | 320/109 |
| 2013/0162221 | A1 | 6/2013 | Jefferies | |
| 2013/0179061 | A1* | 7/2013 | Gadh | B60L 53/63 |
| | | | | 701/1 |
| 2013/0307475 | A1 | 11/2013 | Kishiyama et al. | |
| 2014/0265566 | A1* | 9/2014 | Nguyen | H02J 7/0071 |
| | | | | 307/23 |
| 2014/0354227 | A1 | 12/2014 | Tyagi et al. | |
| 2015/0137768 | A1* | 5/2015 | Kish | B60L 58/27 |
| | | | | 320/137 |
| 2016/0221463 | A1* | 8/2016 | Kondo | B60L 58/12 |
| 2017/0110901 | A1* | 4/2017 | Amarasekara | B64F 1/007 |
| 2018/0015833 | A1* | 1/2018 | Namou | B60L 53/122 |
| 2018/0118045 | A1* | 5/2018 | Gruzen | B60L 53/65 |
| 2018/0175666 | A1* | 6/2018 | Ayer | H02J 13/00028 |
| 2020/0023747 | A1* | 1/2020 | Logvinov | B60L 53/66 |

FOREIGN PATENT DOCUMENTS

| | | | | |
|---|---|---|---|---|
| DE | 102013211265 | | 12/2014 | |
| WO | WO-2013080211 A | * | 6/2013 | B60L 58/16 |

OTHER PUBLICATIONS

European Patent Application No. 18802958.1 extended European search report and European search opinion dated Sep. 9, 2020.

* cited by examiner

AUTOMATED ELECTRIC VEHICLE CHARGING

RELATED APPLICATIONS

This application claims the benefit to U.S. patent application Ser. No. 15/981,468, filed May 16, 2018, which claims benefit to U.S. Provisional Patent Application No. 62/506,890, filed on May 16, 2017, the entire contents of both of which are incorporated herein by reference.

FIELD

Embodiments relate generally to charging an electric vehicle.

SUMMARY

Utility providers charge consumers for electricity consumed at different rates for different times. For example, a utility provider may charge a higher rate during on-peak hours (for example, during the day) and a lower rate during off-peak hours (for example, during the night). Chargers for electric vehicles, once plugged in, may perform charging operation without differentiating between on-peak and off-peak rates, thereby, increasing cost to the user.

Thus, one embodiment provides a method for automated charging including storing, in a memory, a rate profile of a power grid and determining, using an electronic processor, a time to full charge. The method also includes determining, using the electronic processor, a target time for completion of charging and generating, using the electronic processor, a charging profile. The method further includes charging, using a charging controller, based on the charging profile.

One embodiment provides a charger for automated charging including an electronic processor coupled to a memory, a transceiver, and a charging controller. The electronic processor is configured to store, in the memory, a rate profile of a power grid and determine a time to full charge. The electronic processor is also configured to determine a target time for completion of charging and generate a charging profile. The electronic processor is further configured to charge, using the charging controller, based on the charging profile.

One embodiment provides a method for automated charging including receiving, at a server, charging information from each of a plurality of electric vehicle chargers within a geographic boundary served by a single utility provider and generating, using a server electronic processor of the server, a plurality of charging profiles one for each of the plurality of electric vehicle chargers based on the charging information received from the plurality of electric vehicle chargers. The charging profile is generated to minimize load on the utility provider. The method also includes transmitting, using a server transceiver of the server, the plurality of charging profiles to the plurality of electric vehicle chargers. The electric vehicle chargers perform charging based on a charging profile from the plurality of charging profiles.

Other aspects of the application will become apparent by consideration of the detailed description and accompanying drawings.

DETAILED DESCRIPTION

Before any embodiments of the application are explained in detail, it is to be understood that the application is not limited in its application to the details of construction and the arrangement of components set forth in the following description or illustrated in the following drawings. The application is capable of other embodiments and of being practiced or of being carried out in various ways.

Figure 1:
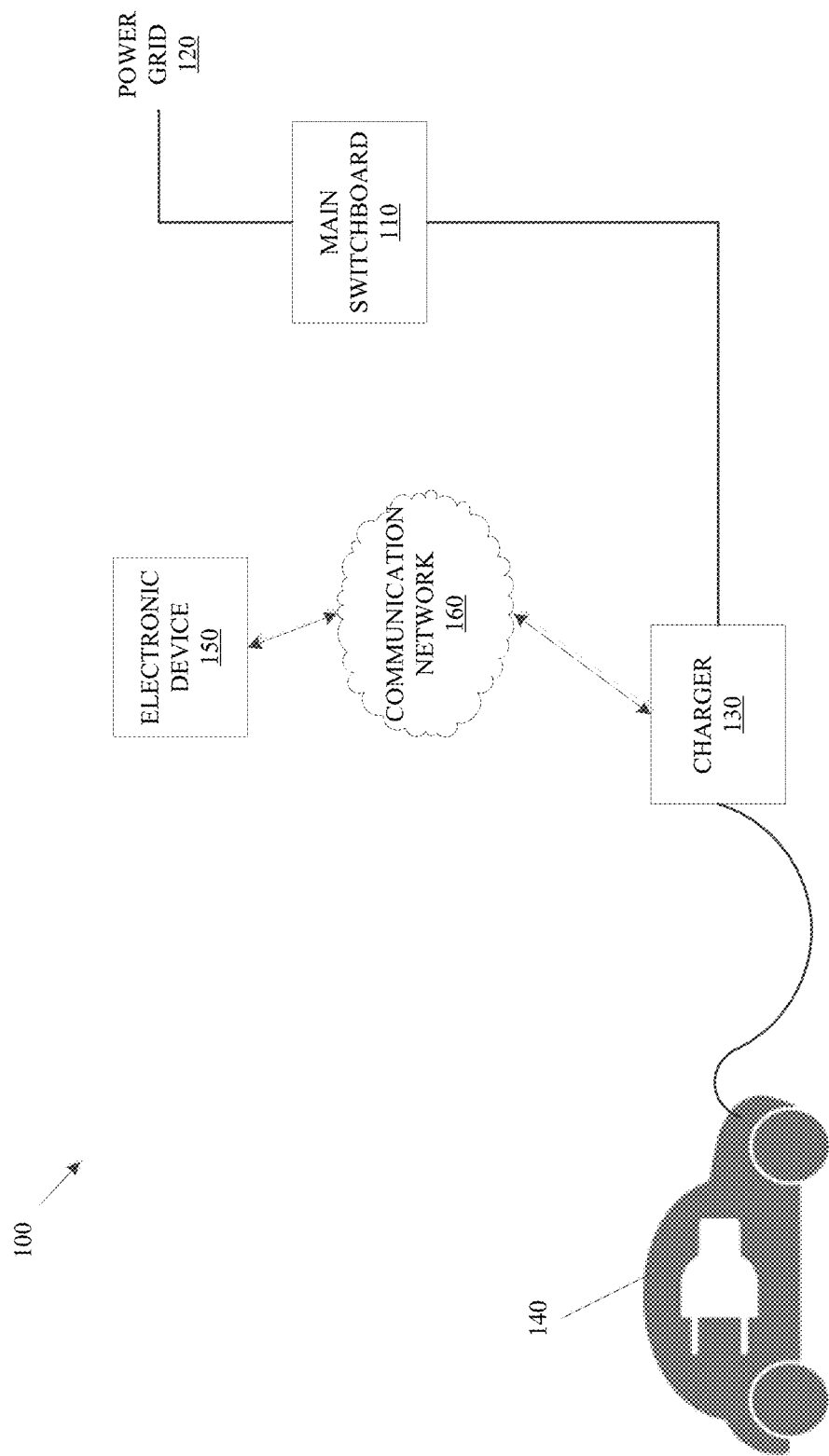
FIG. 1 is a block diagram of an automated charging system in accordance with some embodiments.

FIG. 1 is a block diagram of one embodiment of an automated charging system 100. In the example illustrated, the automated charging system 100 includes a main switchboard 110 that receives power from a power grid 120, for example, a power grid of a utility company, solar panels, or the like. An electric vehicle (EV) charger 130 used to charge an electric vehicle 140 is connected to the main switchboard 110 to receive operating power. The automated charging system 100 also includes an electronic device 150 that allows a user to set charging parameters of the EV charger 130. The electronic device 150 may be, for example, a smart telephone, a tablet computer, a laptop computer, a desktop computer, and the like. The EV charger 130 and the electronic device 150 may communicate over a communication network 160.

The communication network 160 may be a wireless communication network such a wide area network (WAN) (e.g., the Internet, a TCP/IP based network, a cellular network, such as, for example, a Global System for Mobile Communications [GSM] network, a General Packet Radio Service [GPRS] network, a Code Division Multiple Access [CDMA] network, an Evolution-Data Optimized [EV-DO] network, an Enhanced Data Rates for GSM Evolution [EDGE] network, a 3GSM network, a 4GSM network, a Digital Enhanced Cordless Telecommunications [DECT] network, a Digital AMPS [IS-136/TDMA] network, or an Integrated Digital Enhanced Network [iDEN] network, etc.). In other embodiments, the network is, for example, a local area network (LAN), a neighborhood area network (NAN), a home area network (HAN), or personal area network (PAN) employing any of a variety of communications protocols, such as Wi-Fi, Bluetooth, ZigBee, etc. In yet another embodiment, the network 160 includes one or more of a wide area network (WAN), a local area network (LAN), a neighborhood area network (NAN), a home area network (HAN), or personal area network (PAN). In some embodiments, the electronic device 150 may communicate through a server hosted on a manufacturer's website. That is, the electronic device 150 and the EV charger 130 may connect the server over a local area network and/or over a wide area network.

Figure 2:
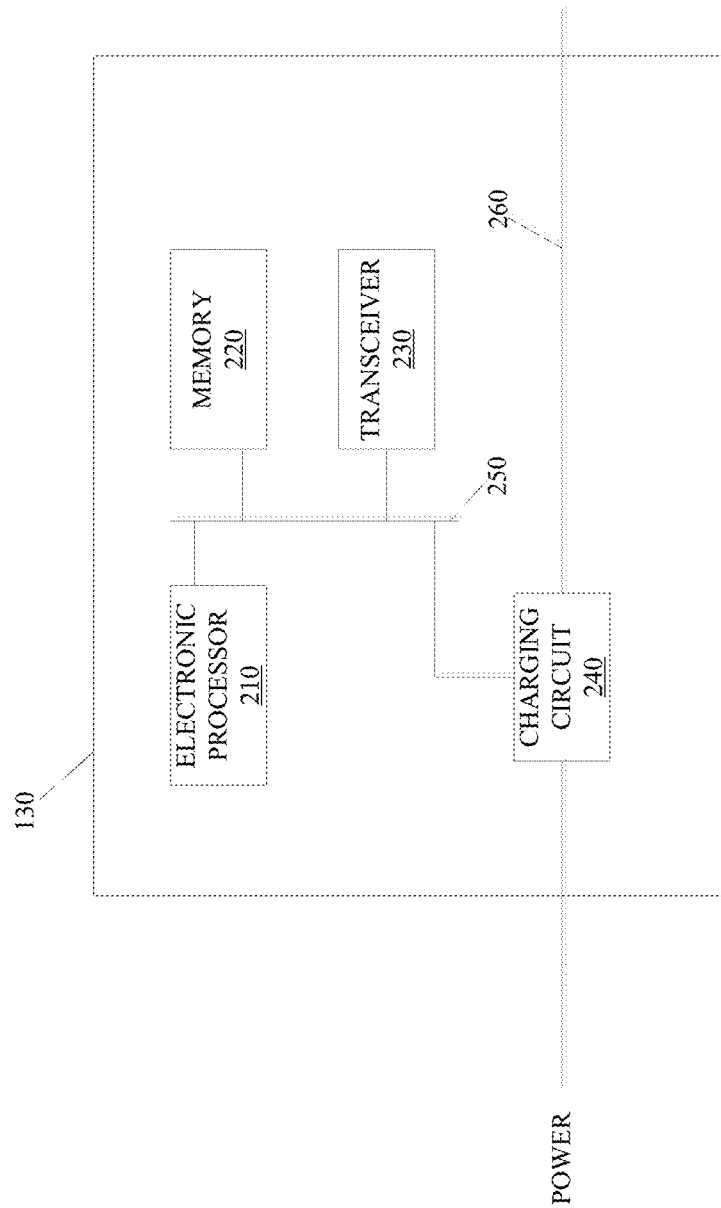
FIG. 2 is a block diagram of an electric vehicle charger of the charging system of FIG. 1 in accordance with some embodiments.

FIG. 2 is a block diagram of one embodiment of the EV charger 130. In the example illustrated, the EV charger 130 includes an electronic processor 210, a memory 220, a transceiver 230, and a charging circuit 240. The electronic processor 210, the memory 220, the transceiver 230, and the charging circuit 240 may communicate over one or more control and/or data buses (for example, a communication bus 250).

In some embodiments, the electronic processor 210 is implemented as a microprocessor with separate memory, such as the memory 220. In other embodiments, the electronic processor 210 may be implemented as a microcontroller (with memory 220 on the same chip). In other embodiments, the electronic processor 210 may be implemented using multiple processors. In addition, the electronic processor 210 may be implemented partially or entirely as, for example, a field-programmable gate array (FPGA), and application specific integrated circuit (ASIC), and the like and the memory 220 may not be needed or be modified accordingly. In the example illustrated, the memory 220 includes non-transitory, computer-readable memory that stores instructions that are received and executed by the electronic processor 210 to carry out functionality of the EV charger 130 described herein. The memory 220 may include, for example, a program storage area and a data storage area. The program storage area and the data storage area may include combinations of different types of memory, such as read-only memory and random-access memory.

The transceiver 230 enables wireless communication from the EV charger 130 to, for example, the electronic device 150 or a remote server over the communication network 160. In other embodiments, rather than a transceiver 230, the EV charger 130 may include separate transmitting and receiving components, for example, a transmitter, and a receiver. In yet other embodiments, the EV charger 130 may not include transceiver 230 and may communicate with the electronic device 150 via a network interface and a wired connection to the communication network 160.

The charging circuit 240 receives power from the main switchboard 110 and provides a charging current to the electric vehicle 140. The charging circuit 240 may include sensors and/or detectors to detect parameters of the EV charger 130 and/or a connected electric vehicle 140. For example, the charging circuit 240 may include a state of charge detector to detect a state of charge (SOC) of the electric vehicle 140, a temperature sensor to detect a temperature of the EV charger 130, and the like. In some embodiments, the charging circuit 240 may include a load shedder (not shown) to reduce a charge rating (i.e., charging current) of the EV charger 130. The charging circuit 240 may receive control signals from the electronic processor 210 instructing the charging circuit 240 to, for example, start charging, stop charging, detect a state of charge (SOC), or the like.

Figure 3:
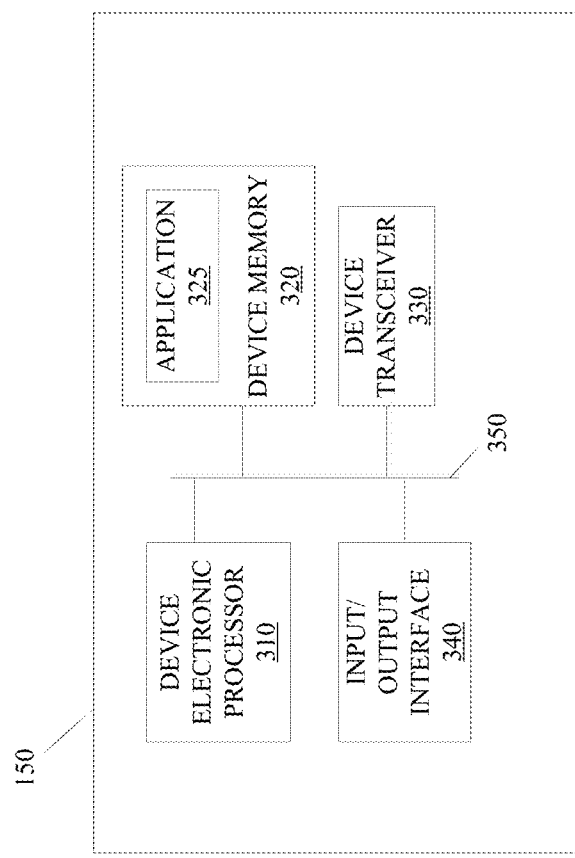
FIG. 3 is a block diagram of an electronic device of the charging system of FIG. 1 in accordance with some embodiments.

FIG. 3 is a block diagram of one embodiment of the electronic device 150. In the example illustrated, the EV charger 130 includes a device electronic processor 310, a device memory 320, a device transceiver 330, and an input/output interface 340. The device electronic processor 310, the device memory 320, the device transceiver 330, and the input/output interface 340 may communicate over one or more control and/or data buses (for example, a device communication bus 350).

The device electronic processor 310 may be implemented in various ways including ways that are similar to those described above with respect to the electronic processor 210. Likewise, the device memory 320 may be implemented in various ways including ways that are similar to those described with respect to the memory 220. The device memory 320 may store instructions that are received and executed by the device electronic processor 310 to carry out the functionality described herein. In addition, the device memory 320 may also store a charger application 325.

The device transceiver 330 enables communication (for example, wireless communication) from the electronic device 150 to, for example, the EV charger 130 or a remote server over the communication network 160. In other embodiments, rather than a device transceiver 330, the electronic device 150 may include separate transmitting and receiving components, for example, a transmitter, and a receiver. In yet other embodiments, the electronic device 150 may not include a device transceiver 330 and may communicate with the EV charger 130 via a network interface and a wired connection to the communication network 160.

The input/output interface 340 (for example, a user interface) may include one or more input mechanisms (for example, a touch screen, a keypad, a button, a knob, and the like), one or more output mechanisms (for example, a display, a speaker, and the like), or a combination thereof.

Figure 4:
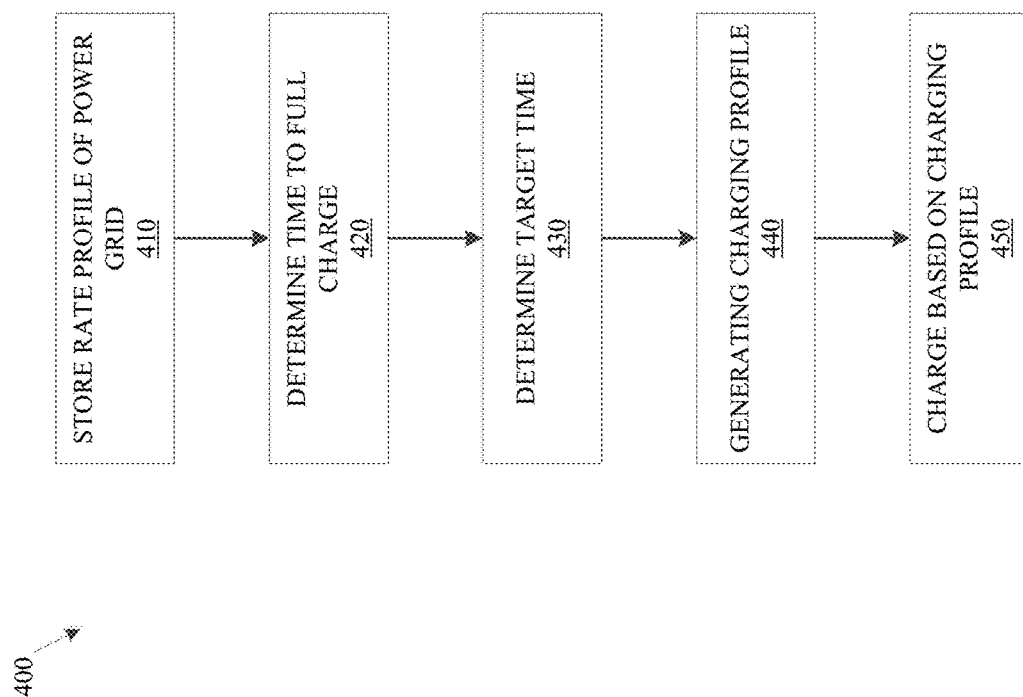
FIG. 4 is a flowchart illustrating a method of the charging system of FIG. 1 in accordance with some embodiments.

FIG. 4 is a flowchart illustrating one example method 400 for automated charging. It should be understood that the order of the steps disclosed in method 400 could vary. Additional steps may also be added to the control sequence and not all of the steps may be required. As illustrated in FIG. 4, the method 400 includes storing, in the memory 220, a rate profile of the power grid 120 (at block 410). The rate profile provides a mapping between a plurality of rates charged by a utility company and the time period at which the rates are charged. For example, a utility provider operating the power grid 120 may charge a relatively higher rate per kilowatt-hour during the day (for example, $0.50 per kW-h between 7 AM and 7 PM) and may charge a relatively lower rate per kilowatt-hour during the night (for example, $0.20 per kW-h between 11 PM and 5 AM).

In some embodiments, the rate profile may be manually entered by a user. For example, the user may input a specific dollar amount for several intervals during a single 24-hour period. Alternatively the user may input a relative price indication, for example, high, medium, low, or the like for several intervals during a single 24-hour period. That is, continuing with the above rate profile example, a user may input high for times between 7 AM and 7 PM, low between 11 PM and 5 AM, and medium for other times. The user may input the rate profile information on the input/output interface 340 of the electronic device 150, which then transfers the rate profile to the EV charger 130 over the communication network 160. In some embodiments, the rate profile may be automatically received from a utility provider. For example, the EV charger 130 may receive an address of the user and determine a utility provider based on the address. The EV charger 130 may then download a rate profile from a website of the utility provider. Other techniques may also be used to receive a rate profile of the power grid 120.

The method 400 includes determining, using the electronic processor 210, a time to full charge (at block 420). When the electric vehicle 140 is plugged in for charging, the electronic processor 210 may first determine an initial SOC of the electric vehicle 140. The electronic processor 210 estimates an amount of time to fully charge the electric vehicle 140 based on the initial SOC of the electric vehicle 140 and a charging rate of the charging circuit 240. For example, the electronic processor 210 may determine that the initial SOC is "20%." Based on this initial SOC and a charging rate of the charging circuit 240, the electronic processor 210 may determine that the electric vehicle 140 will be fully charged if continuously charged for "8" to "10" hours.

The method 400 includes determining, using the electronic processor 210, a target time for completion of charging (at block 430). In one embodiment, the target time may be determined based on a user input. For example, a user may input, on the input/output interface 340 of the electronic device 150, that the user will be leaving for work at 8 AM the next day. The electronic device 150 then transfers this information to the EV charger 130 over the communication network 160.

The method 400 includes generating, using the electronic processor 210, a charging profile (at block 440). The charging profile may be generated based on the rate profile of the power grid 120, the time to full charge, and/or the target time for completion of charging. The electronic processor 210 may generate an optimum charging profile to minimize cost to the user. Continuing with the above examples, where the time to full charge is "8" hours and the user will be leaving at 8 AM, the electronic processor 210 may determine that the electric vehicle 140 may be charged between 9 PM and 5 AM to minimize the cost to the user. That is, the electric vehicle 140 will be charged at a medium rate between 9 PM and 11 PM and at a low rate between 11 PM and 5 AM based on the above rate profile example. Accordingly, the EV charger 130 may maximize charging during a low rate period of the power grid 120.

In some embodiments, when the charging cannot be completed before the target time, the electronic processor 210 may generate a charging profile where the electric vehicle 140 is continuously charged between the time the electric vehicle 140 was plugged in and the target time.

The method 400 includes charging, using the charging circuit 240, based on the charging profile (at block 450). The electronic processor 210 controls the charging circuit 240 to charge the electric vehicle 140 based on the charging profile. Continuing the above example, the electronic processor 210 may control the charging circuit 240 to turn off charging until 9 PM, turn on charging between 9 PM and 5 AM, and turn off charging after 5 AM.

Figure 5:
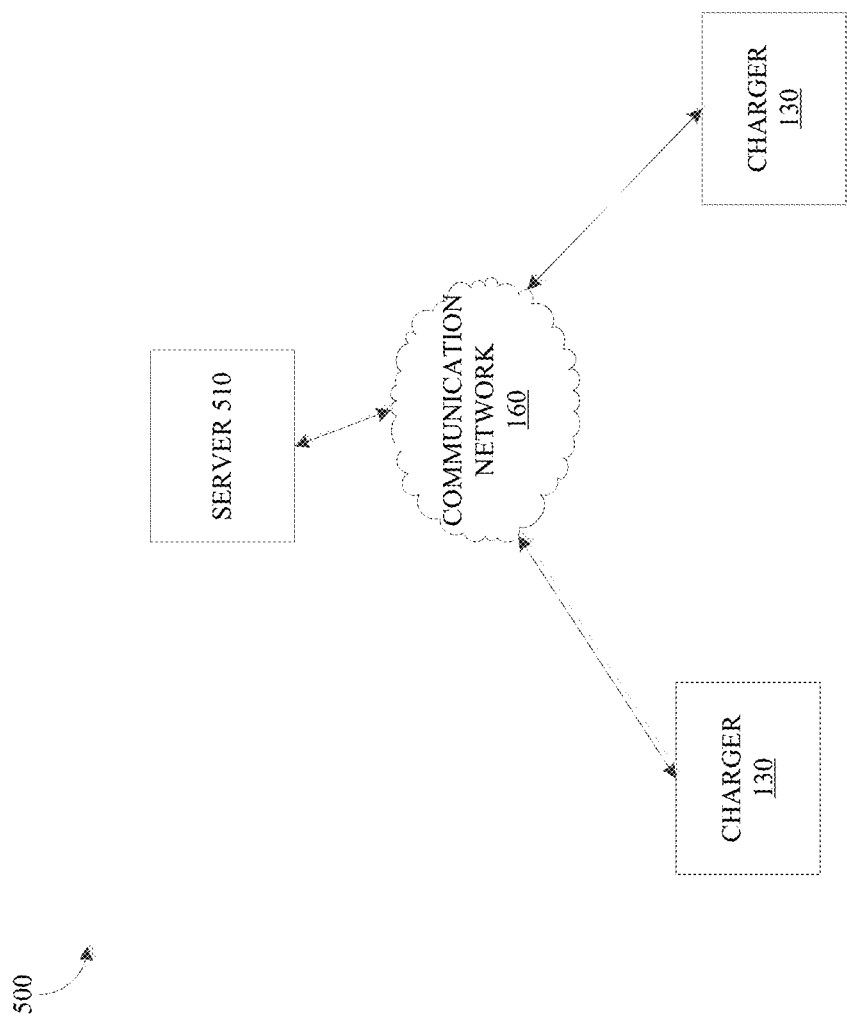
FIG. 5 is a block diagram of an automated charging network in accordance with some embodiments.

FIG. 5 is a block diagram of one embodiment of an automated charging network 500. In the example illustrated, the automated charging network includes a plurality of EV chargers 130 communicating with a server 510 over the communication network 160. The server 510 is for example, a server operated by the manufacturer of the EV chargers 130. As another example, the server 510 is a server operated by a utility provider and/or a utility aggregator. In some embodiments, the server 510 is a cloud based server that can communicate over the communication network 160. In addition to communicating with the server 510, the plurality of EV chargers 130 may also communicate with each other over the communication network 160. The plurality of EV chargers 130 may be controlled to implement charging such that the load is distributed and balanced on a power grid. In some embodiments, the coordination may be implemented using a centralized system in which the determinations are performed by a central server, for example, the server 510. In other embodiments, the coordination may be implemented using a decentralized system in which the determinations are distributed over the several EV chargers 130, and the central server 510 may not be needed or may be modified accordingly.

Figure 6:
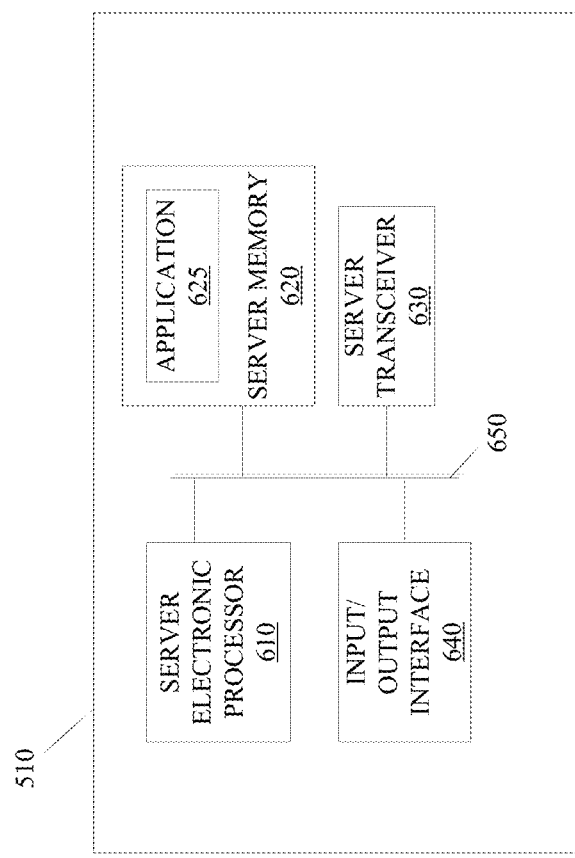
FIG. 6 is a block diagram of a server of the charging network of FIG. 5 in accordance with some embodiments.

FIG. 6 is a block diagram of one embodiment of the server 510. In the example illustrated, the EV charger 130 includes a server electronic processor 610, a server memory 620, a server transceiver 630, and an input/output interface 640. The server electronic processor 610, the server memory 620, the server transceiver 630, and the input/output interface 640 may communicate over one or more control and/or data buses (for example, a server communication bus 650).

The server electronic processor 610 may be implemented in various ways including ways that are similar to those described above with respect to the electronic processor 210 and device electronic processor 310. Likewise, the server memory 320 may be implemented in various ways including ways that are similar to those described with respect to the memory 220 and the device memory 320. The server memory 620 may store instructions that are received and executed by the server electronic processor 610 to carry out the functionality described herein. In addition, the server memory 320 may also store a charger co-ordination application 625.

The server transceiver 630 enables communication (for example, wireless communication) from the server 510 to, for example, the plurality of EV chargers 130 over the communication network 160. In other embodiments, rather than a server transceiver 630, the server 510 may include separate transmitting and receiving components, for example, a transmitter, and a receiver. In yet other embodiments, the electronic device 150 may not include a device transceiver 330 and may communicate with the EV charger 130 via a network interface and a wired connection to the communication network 160.

The input/output interface 340 (for example, a user interface) may include one or more input mechanisms (for example, a touch screen, a keypad, a button, a knob, and the like), one or more output mechanisms (for example, a display, a speaker, and the like), or a combination thereof.

Figure 7:
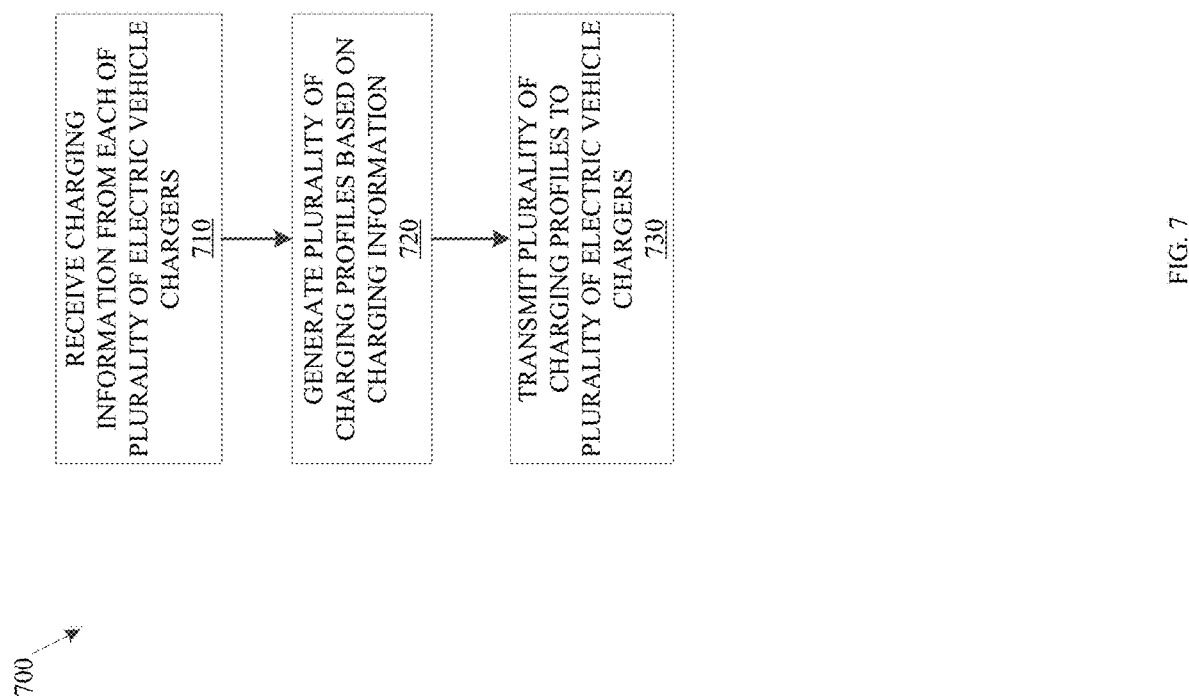
FIG. 7 is a flowchart illustrating a method of the charging network of FIG. 5 in accordance with some embodiments.

FIG. 7 is a flowchart illustrating one example method 700 for automated charging. It should be understood that the order of the steps disclosed in method 700 could vary. Additional steps may also be added to the control sequence and not all of the steps may be required. As illustrated in FIG. 7, the method 700 includes receiving, at the server 510, charging information from each of the plurality of the EV chargers 130 (at block 710). The plurality of EV chargers 130 communicate with the server 510 over the communication network 160 to provide the charging information. The charging information includes, for example, a GPS location or address location of the EV charger 130, a state of charge of an electric vehicle 140 being charged by the EV charger 130, a target time for completing charging of the electric vehicle 140, and the like. The server 510 can use the charging information to control the load distribution among the EV chargers 130 within a geographic boundary. Geographic boundary may refer to a location, for example, a neighborhood, a community, a district, or the like that are served by a single utility provider. In some embodiments, the server 510 groups a subset of the plurality of EV chargers 130 into groups based on the location information received from the plurality of EV chargers 130. For example, the server 510 groups a subset of the plurality of EV chargers 130 into a group if they belong to the same neighborhood and are served by the same utility provider or belong to the same power grid 120. At block 710, the server 510 may receive charging information from a plurality of EV chargers 130 that are within a geographic boundary and served by a single utility provider.

The method 700 also includes generating, using the server electronic processor 610, a plurality of charging profiles based on the charging information (at block 720). The server 510 analyzes the charging information received from the plurality of EV chargers 130 within the geographic boundary to optimize the load on the power grid 120. For example, the electric vehicles 140 are typically connected to the EV chargers 130 around 6 PM after a work day and are assigned to be charged by 6 AM the next day. Accordingly, if all the electric vehicles 140 are charged at the same time, the power draw may overload the power grid 120. The server 510 analyzes the charging information received from the plurality of EV chargers 130 to delay and distribute the load across the plurality of EV chargers 130 within the geographic boundary. The server 510 generates a charging profile for each of the plurality of EV chargers 130 based on the charging information received from the plurality of EV chargers 130. The charging profile may include the time at which the EV charger 130 should begin charging and the amount of current draw (i.e., charge rating) the EV charger 130 should use. The charging profiles are generated to distribute the load on the power grid 120 over a period of time. That is, the charging profiles are generated to minimize the load on the power grid 120.

The method 700 further includes transmitting, using the server transceiver 630, the plurality of charging profiles to the plurality of EV chargers 130 (at block 730). The server 510 transmits a charging profile assigned to a particular EV charger 130 to that EV charger 130 over the communication network 160. The EV charger 130 implements the charging profile upon receiving the charging profile from the server 510.

One of ordinary skill in the art would appreciate that the functionality described in method 400 may be performed by the electronic processor 210 or may be shared between the electronic processor 210 and the device electronic processor 310. For example, in one embodiment, the device electronic processor 310 may generate the charging profile based on inputs received from the user and an initial SOC received from the EV charger 130. The electronic device 150 may then transfer the charging profile to the EV charger 130. In addition, although the method 400 is described as being performed by an EV charger 130, the functionality may be performed by any charger or electrical appliance connected to the main switchboard 110.

Similarly, one of ordinary skill in the art would appreciate that the functionality described in method 700 may be performed by the EV chargers 130 that are within a geographic boundary. For example, the functionality described in method 700 may be distributed over the electronic processors 210 of the plurality of EV chargers 130 within the geographic boundary.

Thus, the application provides, among other things, automated electric vehicle charging.

The invention claimed is:

1. A method for automated charging, the method comprising:
   storing, in a memory, a rate profile of a power grid, the rate profile including at least one time period, at least one rate associated with the at least one time period, and a user-entered input relative to a price indication including at least one selected from a group consisting of a low price indication, a medium price indication, and a high price indication;
   generating, using the electronic processor and based on the rate profile, a time to full charge, and a target time for completion of charging, a charging profile; and
   charging, using a charging controller of a charger coupled to the electronic processor, based on the charging profile, wherein when charging cannot be completed before the target time, the electronic processor generates a rate profile that continuously charges to the target time.

2. The method of claim 1, further comprising:
   determining, using an electronic processor coupled to the memory, a time to full charge; and
   determining, using the electronic processor, a target time for completion of charging;
   wherein generating the charging profile is further based on the time to full charge and the target time for completion of charging.

3. The method of claim 1, wherein the charging profile is generated to minimize cost.

4. The method of claim 1, further comprising:
   receiving, at the electronic processor, the rate profile from an electronic device, wherein the rate profile is received as an input at a user interface of the electronic device.

5. The method of claim 1, further comprising;
   receiving, at the electronic processor, the rate profile from a utility provider.

6. The method of claim 1, wherein the charger is an electric vehicle charger.

7. The method of claim 1, further comprising:
   determining an initial state of charge; and
   determining a charge rating of the charger, wherein determining the time to full charge is based on the initial state of charge and the charge rating.

8. The method of claim 1, wherein determining the target time for completion of charging comprises:
   receiving the target time for completion of charging at a user interface of an electronic device;
   receiving, at the electronic processor, the target time for completion of charging from the electronic device.

9. The method of claim 8, further comprising:
   receiving, at the electronic processor, the rate profile from the electronic device, wherein the rate profile is received as an input at the user interface of the electronic device.

10. A charger for automated charging, the charger comprising:
    a memory;
    a transceiver;
    a charging controller; and
    an electronic processor coupled to the memory, the transceiver, and the charging controller, the electronic processor configured to:
      receive a user-entered input relative to a price indication;
      store, in the memory, a rate profile of a power grid, the rate profile including at least one time period, at least one rate associated with the at least one time period, and the user-entered input relative to a price indication including at least one selected from a group consisting of a low price indication, a medium price indication, and a high price indication,
      generate a charging profile based on the rate profile, a time to full charge, and a target time for completion of charging, and
      charge, using the charging controller, based on the charging profile, wherein when charging cannot be completed before the target time, the electronic processor generates a rate profile that continuously charges to the target time.

11. The charger of claim 10, wherein the controller is further configured to:
    determine a time to full charge, and
    determine a target time for completion of charging, wherein the charging profile is further based on the time to full charge and the target time for completion of charging.

12. The charger of claim 10, wherein the charging profile is generated to minimize cost.

13. The charger of claim 10, wherein the electronic processor is further configured to:
   receive the rate profile from an electronic device, wherein the rate profile is received as an input at a user interface of the electronic device.

14. The charger of claim 10, wherein the electronic processor is further configured to;
   receive the rate profile from a utility provider.

15. The charger of claim 10, wherein the charger is an electric vehicle charger.

16. The charger of claim 10, wherein the electronic processor is further configured to:
   determine an initial state of charge; and
   determine a charge rating of the charger, wherein determining the time to full charge is based on the initial state of charge and the charge rating.

17. The charger of claim 10, wherein determining the target time for completion of charging comprises:
   receiving the target time for completion of charging at a user interface of an electronic device;
   receiving the target time for completion of charging from the electronic device.

18. The charger of claim 17, wherein the electronic processor is further configured to:
   receive the rate profile from the electronic device, wherein the rate profile is received as an input at the user interface of the electronic device.

* * * * *